3,149,020
ADHESIVE LAMINATION
Reid G. Fordyce, Longmeadow, and Daniel J. Thomas, Springfield, Mass., assignors to Fome-Cor Corporation, Springfield, Mass., a corporation of Delaware
No Drawing. Filed Feb. 1, 1961, Ser. No. 86,329
14 Claims. (Cl. 161—161)

The present invention relates to laminates constituting sheets of flexible cellulosic material having interposed a foamed resin core, and, more particularly, to coated laminates of this type.

Laminates constitued of sheets of paper or other similar flexible cellulosic materials interposing a core or layer of foamed resin material, the latter exemplified by foamed polystyrene, have many recognized usages. They exhibit good strength and insulating properties despite being light in weight and easily fabricated. In particular, these laminates have found considerable use in packaging, for example in boxes, cartons and the like.

Because of their ability to take permanent set when subjected to pressure, the subject laminates can be conveniently embossed, and consequently can be used to advantage in production of signs and other advertising and display items as well as decorative items, the attractiveness of which is contributed to by their ability to assume a permanent third dimension.

These same laminates, however, suffer one serious shortcoming which broadly restricts their use, to wit: they lose flexural rigidity on exposure to high humidity or water. This is magnified by the fact that the resin cores are impervious to water, which leads to permanent warping of the laminates which exposure to moisture at a single surface.

In attempting to overcome the problem of moisture damage, a number of expedients have been practiced. These principally take the form of providing various coatings, including both natural and synthetic materials such as natural and synthetic rubbers, synthetic resin emulsion coatings such as styrene latices, alkyd resins, lacquers, varnishes, etc., to the exterior surfaces of the paper sheets. While these practices have resulted in a certain degree of success in answering the problem of moisture attack, nevertheless, none of the coatings suggested to date have evidenced all the properties which are desirable, both during application, and in the final laminate product. Specifically, those properties which are desirable, in addition to that of improving moisture resistance in the final laminate product, are during the coating application; ease of application and the capability of curing to form a continuous non-blocking film or coating by use of convenient drying equipment, that is drying ovens operating at less than about 180° F. In addition, and reflective of decorative aspects, it would be desirable for the cured coating to be capable of being embossed, and additionally be able to perform as a dielectrically activated adhesive in order that various decorative films, sheets or overlays such as those of polyvinyl chloride could be adhesively incorporated to the exterior surfaces of the paper sheets of the laminates. Desirable performance in this latter regard, prescribes that the dielectrically produced bond remain intact under immersion in water on exposure to temperatures up to 200° F., and, further that the coating does not stain the decorative overlay or have its adhesiveness adversely affected by migration of plasticizer present in the said overlay.

Accordingly, it is a principal object of this invention to provide coatings which when applied to the exterior surfaces of laminates constituted of sheets of flexible cellulosic material interposing a foamed resin core (paper-foam resin laminates) can be dried or cured to form continuous coatings capable of being embossed and resistant to moisture attack.

Another object is that of providing coatings of the type referred to immediately above which can perform as a dielectrically activated adhesive in providing decorative overlays on the said paper-foamed resin laminates.

Other objects of the invention will in part be obvious and will in part appear hereinafter.

These and other objects are obtained through utilization of a heat-sealable coating composition comprising a blend of (A) a ternary interpolymer of vinylidene chloride, vinyl chloride and an ester of an alpha,beta unsaturated carboxylic acid and (B) a styrene-maleic component interpolymer wherein the maleic component consists at least predominantly of an alkyl half-ester of maleic anhydride, that is at least a predominant number of the anhydride groups of the initial maleic anhydride have been converted to half-esters, the ester portion or half being terminated in alkyl radicals or groups.

EXAMPLE I

A paper-foam resin laminate is prepared by heat-bonding a sheet of 42 lb. natural kraft liner board to each of the flat surfaces of a sheet of foamed polystyrene, the latter having a thickness of ⅛ inch and a core density of about 4 lbs. per cubic foot.

A coating latex is prepared by dispersing in 165 parts of water and 3 parts of ammonium hydroxide (28%) a blend of:

(A) 100 parts of a ternary interpolymer constituting 78 parts of vinylidene chloride, 8 parts of vinyl chloride, and 14 parts of butyl acrylate, and, (B) 8.0 parts of a styrene-maleic component interpolymer constituted of 1.4 mols of styrene and 1.0 mol of maleic component, the latter constituting maleic anhydride, of which about 0.2 mols of the anhydride groups are reacted with methyl alcohol to form methyl half-ester functions, and, about 0.75 mols of the anhydride groups are reacted with secondary butyl alcohol to form secondary butyl half-ester functions.

A portion of the latex is coated onto each of the broad exterior surfaces of the laminate. The coating process is adjusted to provide a dry coat of about 6 lbs./1000 sq. feet of paper surface. The assembly is allowed to dry at room temperature for a period of 72 hours, and, at this point exhibits a clear, continuous, fused flexible coating which is light amber in coloration. When exposed to a temperature of 140° F. for a period of 24 hours the coating does not soften or become tacky.

A section of the coated laminate provided above, is overlaid at each of its broad surfaces, with an 8 mil. sheet of plasticized polyvinyl chloride containing 40 parts of di-2-ethylhexyl phthalate plasticizer per 100 parts of polyvinyl chloride resin. The assembly is then placed in a flat bed press provided with dielectric heating elements arranged in a pattern. The embossing pattern constitutes repeating 1 inch diamonds having ⅛ inch indentation. The heating element is energized for a period of 5 seconds providing a potential gap of 2500 volts, incidental with subjecting the assembly to a pressure of 500 p.s.i. on the pattern. Upon removal from the press, the plastic overlay is found to be securely adhered through the coating to the paper-foamed resin laminate, and, the exterior surface of the overlay exhibits a sharp, positive, and permanent reproduction of the embossing pattern. Neither is there any discernable staining of the plastic overlays by the coating. Additionally, when the laminate is exposed to a temperature of 200° F. for a period of 90 hours, no appreciable migration of plasticizer can be observed. When the overlaid laminate is immersed in water at room temperature for 24 hours the adhesive bonding provided by the coating is not destroyed, nor does any warping result.

Another section of the construction earlier provided above, is overlaid with plasticized polyvinyl chloride as above with the exception that a separate 2¼ ounce non-woven pad ⅜₆ inch in thickness and comprising 50% wool and 50% Vinyon fiber, an unplasticized vinyl resin fiber comprised of copolymers of vinyl chloride and vinyl acetate, bonded with a plasticized polyvinyl chloride resin emulsion is interposed between the overlay and the coating. This assembly is then embossed and dielectrically bonded in the manner previously described to provide a plastic sheet overlaid laminate having essentially the same properties of moisture imperviousness as that produced above. The laminate product is characterized by the fact that the pad is adhesively bonded and integrated between the coating and the overlay.

For end uses, such as those presently preferred, that is provision of paper-foamed resin laminates to which plastic overlays are to be adhesively applied, the problem of blocking or sticking is of considerable importance. For instance, after the laminates are coated and before they are provided with the plastic overlays, convenience is served if they could be simply stacked together. If, however, on stacking, the coated laminates stick or block, then many become unusable and the operation is disrupted.

Simultaneous with blocking consideration, or rather the lessening of blocking, any improvement in blocking should not be accomplished by or through excessive loss of the adhesive qualities of the coating. The following examples indicate that using 5–20 parts by weight of the styrene-maleic component interpolymer (B) per 100 parts by weight of ternary interpolymer (A) give excellent performance in those two properties.

EXAMPLES II TO VII

The procedure set forth in Example I is repeated again to provide coated laminates, with the exceptions (a) that the amounts of ternary interpolymer (A) and styrene-maleic component interpolymer (B) are varied in the amounts indicated below and (b) in producing the coating latices the ammonium hydroxide (28%) present in the water is maintained at 35% by weight of interpolymer (B). The amount of blocking which results from the variations practiced is given in Table I following:

Table I

| Interpolymer (A), p.p.w. (solids) | Interpolymer (B), p.p.w. (solids) | Coating Wgt., #1000 ft.² (2 sides) | Blocking ¹, 3 p.s.i. at 140° F. for 24 hrs. |
|---|---|---|---|
| 100 | 21.6 | 12 | 0 |
| 100 | 16.1 | 12 | 0 |
| 100 | 10.8 | 12 | 1 |
| 100 | 8.0 | 12 | 1 |
| 100 | 5.4 | 12 | 2 |
| 100 | 0.0 | 12 | 3 |

¹ 0—no blocking; 1—sticking, no surface marring; 2—sticking, some surface marring; 3—blocking, severe sticking together.

Separate sections of each of the coated laminates are then provided with the plasticized polyvinyl chloride overlays, both (X) with and (Y) without interposed non-woven pads of the type previously described. These are then embossed and bonded by dielectric heating in the manner of Example I. The properties of the adhesive bond which results from each is shown in Table II following:

Table II

HEAT SEAL BOND QUALITY

| Interpolymer (A), p.p.w. (solids) | Interpolymer (B), p.p.w. (solids) | X—With Pads | | Y—Without Pads | |
|---|---|---|---|---|---|
| | | 200° F. for 30 min. | Water Immersion R. T. for 24 Hrs. | 200° F. for 30 min. | Water Immersion R. T. for 24 hrs. |
| 100 | 21.6 | Good | Good | Poor | Poor |
| 100 | 16.1 | F F | Good | Fair | Poor |
| 100 | 10.8 | F F | Fiber Failure | Good | Fair |
| 100 | 8 | F F | Fiber Failure | Fiber Failure | Good |
| 100 | 5.4 | F F | Good | Fiber Failure | Good |
| 100 | 0 | F F | Good | Fiber Failure | Good |

It can be determined from the foregoing tables that when polyvinyl chloride overlay sheets or films are to be directly bonded through the coatings presently sponsored, a range of 5–15 parts of interpolymer (A) on 100 parts of interpolymer (B) performs satisfactorily both as to blocking and bonding or adhesion properties, the latter reflecting moisture imperviousness. However, when a pad is interposed between the coating and the overlay, then, the range of interpolymer (B) amount can be broadened to 5–20 parts of interpolymer (B) while maintaining good, adhesive bonding properties.

EXAMPLE VIII

A coated laminate is provided in the manner set forth in Example I, with the exception that 1.0 mol of the butyl half-ester of maleic anhydride is used in the interpolymer (B) in place of the half-ester used there. The butyl half-ester represents about 96 mol percent of the anhydride groups on the initial maleic anhydride reacted with butyl alcohol, and, the remaining 4 mol percent of the anhydride groups remaining unreacted on the maleic component of interpolymer (B). The coated laminate, more particularly the coating, is cured at 200° F. for 2.5 minutes in a circulating air oven to provide a clear continuous coating on the laminate. The coated laminate is then embossed directly without fracturing of the coating evidenced, and, water-imperviousness is observed to be comparable to that of the dielectrically bonded coatings (adhesives) of Example I. Thereafter, a color design is provided directly onto the coating by means of silk screen printing.

EXAMPLE IX

The procedure set forth in Example VIII is again followed with the exception that 1.0 mol of mixed methyl and 2 ethylhexyl half-ester of maleic anhydride is substituted for the butyl half-ester used there. In this instance the mixed alkyl half-ester of maleic anhydride, 0.3 mol of the anhydride groups are reacted with methyl alcohol and 0.65 mol of the anhydride groups are reacted with 2-ethylhexyl alcohol to provide the corresponding mixed half-ester functions on the maleic component (B). The coated surface of the laminate which results, and which is provided with embossing and a printed design, is continuous in nature and is impervious to moisture as reflected by the retention of rigidity by the laminate on being immersed in water for 24 hours at room temperature.

The heat-sealable embossable coatings of the present invention are derived from use of a blend of (A) a ternary interpolymer of vinylidene chloride, vinyl chloride and an ester of an alpha,beta unsaturated carboxylic acid and (B) a styrene-maleic component and wherein the maleic component is a maleic anhydride, in which at least a predominant number of the anhydride groups have been converted to alkyl half-ester groups.

The preferred utilization of the featured coatings is directed to their application to the exterior faces of laminates constituting flexible sheets of cellulosic material interposing a foamed resin core. In a further refinement of the preferred utilization, the coatings are designed to act as dielectrically activatable adhesives with which to facilitate application of decorative overlays, particularly those of polyvinyl chloride, to the exterior surfaces of the cellulosic sheets, otherwise defining the laminates.

The ternary interpolymers (A) which are used in preparing the coatings featured in the present invention are comprised in interpolymerized form of vinylidene chloride, vinyl chloride and an alkyl ester of an alpha,beta unsaturated mono- or dicarboxylic aliphatic acid. Based on 100 parts of interpolymer, the vinylidine chloride content may vary between 70 and 80 parts, the vinyl chloride between 5 and 15 parts, and the ester 5 and 15 parts, all parts being by weight.

The ester component of ternary interpolymer (A) may be an alkyl ester of acrylic, methacrylic, maleic, fumaric, or other alpha,beta unsaturated mono- and dicarboxylic aliphatic acids. Esters of acrylic acid are preferred. The alkyl group can contain from 1 to 12 carbon atoms and may be for example, methyl, ethyl, normal butyl, secondary butyl, 2-ethylhexyl, nonyl, amyl, etc. groups. The number of carbon atoms contained in the alkyl group is one of the factors controlling the physical properties of the coatings. Alkyl groups having fewer carbon atoms provide harder but more brittle coatings, while alkyl groups having from 6 to 10 carbon atoms provide softer but tougher coatings. For the preferred embodiment of this invention wherein a coated laminate of paper sheets interposing a foamed resin core, is to be dielectrically heat sealed to a polyvinyl chloride decorative facing or overlay, the butyl acrylate provides a balance of properties uniquely suitable. However, the variations in ternary interpolymer (A) may be balanced by adjustment of the styrene-maleic component interpolymer (A) to yield coatings having almost identical physical properties.

The ternary interpolymer (A) can be made by conventional suspension or emulsion techniques using conventional suspending or emulsifying agents, and, are most conveniently used in the form of aqueous latices containing about 50% solids by weight.

The styrene-maleic component interpolymer (B) of this invention includes in interpolymerized form styrene and a maleic component, the latter comprising maleic anhydride in which at least a predominant number of the anhydride groups have been converted to alkyl half-ester groups, and preferably mixed alkyl half-ester groups. The styrene-maleic component interpolymers are constituted of the styrene and maleic component, respectively, in a 1.5:1.0 to 1.0:1.0 mol ratio. In general and for purposes of expedience, it can be expected that less than the complete number of anhydride groups of the maleic component will be partially esterified in forming the half-esters, or to state it differently, some of the anhydride groups will remain in unreacted form in the interpolymer. Preferably, a predominant number of the anhydride groups, that is greater than 90 mol percent of the anhydride groups, should be reacted to form the half-ester groups. The alkyl groups of the half-ester moieties can contain from 1 to 12 carbon atoms and as indicated previously to be preferred, the reaction conditions can be so adjusted that some or part of the alkyl groups contain a different number of carbon atoms than the remainder, thus contributing a mixed half-ester of maleic anhydride. Of the half-esters, the mixed methyl secondary butyl half-esters are preferred. Choice of the number and identity of the alkyl groups forming the alkyl half-esters will depend upon the properties desired in the final coating. Generally, however, alkyl groups having fewer carbon atoms will contribute a hardening effect while alkyl groups having a larger number of carbon atoms, ranging up to an including 12 carbon atoms, as previously indicated will contribute a softening effect to the coatings.

The styrene-maleic component interpolymer (B) can be produced by mass polymerization process in which maleic anhydride and an alkyl alcohol (or mixture of alkyl alcohols) are reacted at about 80° C. for a period of approximately 2 hours to produce the alkyl half-esters. The reaction mass is then cooled to about 50° C. and styrene, catalyst and chain transfer agent are then added and reaction is carried out at 55°–135° C. for a period of about 16 hours, to produce a solid interpolymer of styrene and maleic component, the latter constituting predominantly the alkyl or mixed alkyl half-ester of maleic anhydride. The solid interpolymer can be ground up to convenient size as desired.

When the ternary interpolymer (A) contains butyl acrylate, the styrene-maleic component interpolymer (B) preferably should contain about 0.2 mol of methyl groups and 0.75 of secondary butyl groups per mole of maleic anhydride to obtain the optimum balance of properties for the preferred embodiment of this invention in which the coated paper-foamed resin laminate is heat-bonded to a polyvinyl chloride decorative overlay or facing.

In general, the amount of styrene-maleic component interpolymer (B) can be varied between 5 and 20 parts per 100 parts of ternary interpolymer (A) to give optimum physical and chemical properties. Within this range, it can be generally assumed that if the amount of interpolymer (B) is increased, the resistance to blocking is improved but at some sacrifice in the strength of the bond. Above 20 parts of interpolymer (B) per 100 parts of ternary interpolymer (A) the heat seal bond is weak and is destroyed by exposure to water or elevated temperatures. If the amount of styrene-maleic component interpolymer (B) is reduced, the strength of the heat seal is generally improved at some sacrifice of the blocking properties. Below 5 parts of interpolymer (B) however, the blocking becomes greater than acceptable.

Within the variations noted above, clear, continuous coatings are obtained on drying which exhibit improved imperviousness to moisture, will not block (stick together) when contacted, as through stacking, at ambient temperatures, will not become tacky at temperatures up to at least 140° F. and will heat seal to various plastic facing sheets and particularly to sheets of plasticized polyvinyl chloride.

In preparing the prescribed coating composition, it is recommended that a 50% solids latex of the ternary interpolymer (A) be used as a base. Water can be added to dilute the latex so that it exhibits a viscosity most suitable to the coating method to be used. The styrene-maleic component interpolymer (B) is then added to the latex under stirring, and, stirring is maintained until uniform dispersion is achieved. The only step which requires care is that of adding alkali which should be in an amount sufficient to solubilize the styrene-maleic component interpolymer. The addition of the alkali is preferably made prior to addition of the styrene-maleic component interpolymer. Where the presence of alkali is not harmful to the contemplated end use, the alkali may be sodium or potassium hydroxides. However, for many end uses the presence of alkali is harmful, consequently it is preferred to use a volatile alkali or alkaline reacting material such as ammonia or a volatile amine. Standard 28% ammonium hydroxide solution operates conveniently to accomplish this purpose.

When the end use, that is the laminate is not to include a plastic overlay sheet, the coatings can be colored by the incorporation of pigments or dyes in the aqueous latex before the coating operation, or the coating itself. After application to the paper and curing, the coatings can be overprinted with conventional printing inks formulated for printing on synthetic resin surfaces.

In the preferred embodiment of this invention, a foamed resin-paper laminate is coated by any of the conventional spraying, brushing, roll coating, air knife, wire-wound rod, doctor blade, etc. techniques and then can be cured at low temperature after which they can be provided with plasticized polyvinyl chloride overlays with or without an interposed plasticized polyvinyl chloride bonded non-woven pad. The resulting assembly can then be embossed and bonded along the impressed lines of the embossing pattern. The polyvinyl chloride overlays preferably contain a substantial amount, e.g., 30 to 50 parts of an ester plasticizer such as di-2-ethylhexyl phthalate per 100 parts of polyvinyl chloride. The sealing is done in conventional dielectric heat-sealing equipment, and, because of the peculiar nature of the presently sponsored coating on the laminate a permanent seal is obtained which cannot be broken even after heating at 200° F. for 30 minutes or after immersion in water for 24 hours at room temperature.

In practicing the preferred utilization of the present invention, the prescribed coating is applied to the exterior surfaces of a paper-foamed resin laminate in the form of an aqueous latex, as previously described. The laminate which prior to coating can be referred to as the initial laminate preferably constitutes a foamed polystyrene core bonded on both flat surfaces to kraft paper.

Polystyrene cores of the type which can be used, can vary in density from 1 to 10 lbs. per cubic foot. The thickness of the foamed sheet can vary between 0.05 to 1.00 inch and thicker where heavier embossing is to be engaged in, as desired.

While the foamed resin core is preferably a styrene homopolymer, other styrene copolymers and ternary interpolymers can also be used to obtain special properties in the core. For many purposes, the polystyrene core can be replaced by sheets of other foamed synthetic resins including foamed vinyl chloride polymers and copolymers, foamed polyurethanes particularly those polyurethanes which are relatively stiff, foamed acrylic resins, foamed linear polyethylene, foamed polypropylene, foamed synthetic rubbers such as butadiene-styrene, butadiene-acrylonitrile, butadiene-isobutylene copolymer rubbers formulated to yield stiff foams. In addition, foamed cores made from polyblends of the above resins and with graft copolymers can be used.

The flexible cellulosic sheet which can be used in providing the initial laminates is preferably paper. The nature of the paper will depend upon the products which are to be eventually produced. Generally, natural kraft liner board having a thickness of .007″ to .025″ will satisfy most requirements, whether overlays are to be used or not. In cases where embossing is to be carried out, the paper must be flexible enough to accept the same. Preferably, the paper is 26 to 100 lb. natural kraft paper board.

It will thus be seen that the objects set forth above, among those made apparent from the preceding description, are efficiently attained and, since certain changes may be made in carrying out the above method and in the article set forth without departing from the scope of the invention, it is intended that all matter contained in the above description shall be interpreted as illustrative and not in a limiting sense.

What is claimed is:

1. A composition for use as a coating adapted, on application to the exterior surfaces of laminates constituted of sheets of cellulosic material interposing a core of foamed resin, to be embossable and provide the said laminates with improved imperviousness to moisture, the said coating comprising a blend of (A) 100 parts by weight of a ternary interpolymer, the said ternary interpolymer consisting of 70–80 parts by weight of vinylidene chloride, 5–15 parts of vinyl chloride and 5–15 parts of an alkyl ester of an alpha,beta unsaturated carboxylic acid and (B) 5–20 parts by weight of a styrene-maleic component interpolymer wherein the maleic component comprises at least a major amount of an alkyl half-ester of maleic anhydride, and wherein the ratio of styrene to maleic component in the said interpolymer ranges respectively 1.5:1.0 to 1.0:1.0 mol percent.

2. The composition of claim 1 wherein the alkyl ester of the alpha,beta unsaturated carboxylic acid is an alkyl ester of acrylic acid, the said alkyl residue containing 1–12 carbon atoms.

3. The composition of claim 2 wherein the alkyl half-ester of acrylic acid is the mixed methyl-butyl half-ester.

4. Embossable moisture impervious laminates constituted of sheets of cellulosic material interposing a core of foamed resin and having applied to the exterior surfaces of the said sheets a blend of (A) 100 parts by weight of a ternary interpolymer of 70–80 parts by weight of vinylidene chloride, 5–15 parts of vinyl chloride and 5–15 parts of an alkyl ester of an alpha-beta unsaturated carboxylic acid and (B) 5–20 parts by weight of a styrene-maleic component interpolymer wherein the maleic component comprises at least a major amount of an alkyl half-ester of maleic anhydride, and wherein the ratio of styrene to maleic component in the said interpolymer ranges respectively 1.5:1.0 to 1.0:1.0 mol percent.

5. The laminate of claim 4 wherein the cellulosic material is paper.

6. The laminate of claim 4 wherein the foamed resin is polystyrene.

7. The laminate of claim 4 wherein the alkyl ester of the alpha,beta unsaturated carboxylic acid is an alkyl ester of acrylic acid, the alkyl residue of which contains 1–12 carbon atoms.

8. The laminate of claim 7 wherein the alkyl ester of acrylic acid is the butyl ester.

9. Embossable moisture impervious laminates constituted of sheets of cellulosic material interposing a core of foamed resin having applied to the exterior surfaces of said sheets a coating and an overlay of plastic material, the said coating comprising a blend of (A) 100 parts by weight of a ternary interpolymer of 70–80 parts by weight of vinylidene chloride, 5–15 parts of vinyl chloride and 5–15 parts of an alkyl ester of an alpha,beta unsaturated carboxylic acid and (B) 5–20 parts by weight of a styrene-maleic component interpolymer wherein the maleic component comprises at least a major amount of an alkyl half-ester of maleic anhydride, and wherein the ratio of styrene to maleic component in the said interpolymer ranges respectively 1.5:1.0 to 1.0:1.0 mol percent.

10. The laminate of claim 9 wherein the cellulosic material is paper.

11. The laminate of claim 9 wherein the foamed resin is polystyrene.

12. The laminate of claim 9 wherein the overlay is polyvinyl chloride.

13. The laminate of claim 9 wherein the alkyl ester of the alpha,beta unsaturated carboxylic acid is an alkyl ester of acrylic acid, the said alkyl residue containing 1–12 carbon atoms.

14. The laminate of claim 13 wherein the alkyl ester of acrylic acid is butyl ester.

References Cited in the file of this patent

UNITED STATES PATENTS 2,537,017    Barrett  ---------------- Jan. 9, 1951
2,943,000    Austin  ---------------- June 28, 1960